United States Patent [19]
Icking et al.

[11] Patent Number: 5,167,200
[45] Date of Patent: Dec. 1, 1992

[54] PULSATOR FOR MILKING MACHINES

[75] Inventors: Friedrich Icking, Oelde; Otto Krone, Beesten, both of Fed. Rep. of Germany

[73] Assignee: Westfalia Separator AG, Oelde, Fed. Rep. of Germany

[21] Appl. No.: 820,474

[22] Filed: Jan. 14, 1992

[30] Foreign Application Priority Data

Jan. 28, 1991 [DE] Fed. Rep. of Germany ....... 4102369

[51] Int. Cl.⁵ ................................................ A01J 5/12
[52] U.S. Cl. .................................. 119/14.41; 137/103
[58] Field of Search ................. 119/14.27, 14.29, 14.3, 119/14.32, 14.34, 14.35, 14.37, 14.38, 14.39, 14.41; 137/103, 104, 105, 624.15

[56] References Cited

U.S. PATENT DOCUMENTS 2,086,678  7/1937  Plint et al. ............................ 137/103
4,909,187  3/1990  Willach .................................. 137/103

FOREIGN PATENT DOCUMENTS 0009292  4/1980  European Pat. Off. ......... 119/14.41
3500296  7/1986  Fed. Rep. of Germany ... 119/14.39
102724  10/1941  Sweden .............................. 137/103
1327851  8/1987  U.S.S.R. ........................... 119/14.37
596506  1/1948  United Kingdom ............... 137/103
789401  1/1958  United Kingdom ............ 119/14.37

Primary Examiner—Gene Mancene
Assistant Examiner—Todd E. Monahan
Attorney, Agent, or Firm—Sprung Horn Kramer & Woods

[57] ABSTRACT

A pulsator for milking machines comprises a bolt which travels back and forth in a housing and activates a slide. The slide alternately connects the pulsator's outlets to a source of vacuum and to the atmosphere. A diaphragm accommodated in a chamber at each end of the slide moves the bolt back and forth. An alternator is triggered by the slide as it arrives at one end or the other of its stroke. The alternator connects the chambers back and forth and alternately to the source of vacuum and to the atmosphere. The distance between the slide and at least one of the diaphragms is varied to suppress stagger.

3 Claims, 1 Drawing Sheet

PULSATOR FOR MILKING MACHINES

BACKGROUND OF THE INVENTION

The invention concerns a pulsator for milking machines, comprising a bolt traveling back and forth in a housing and activating a slide that alternately connects the pulsator's outlets to a source of vacuum and to the atmosphere, a diaphragm accommodated in a chamber at each end of the slide and moving the bolt back and forth, and an alternator triggered by the slide as it arrives at one end or the other of its stroke and connecting the chambers back and forth and alternately to the source of vacuum and to the atmosphere.

Such an alternating pulsator is known from German 3 702 419 C1. It alternately connects the channels between pairs of teat cups in a milking machine to a source of vacuum and to the atmosphere. The channels are connected to the source of vacuum during what is called a suction phase. How long this phase lasts can be varied by varying the pulsator's rate.

The speed at which the bolt travels back and forth in the housing, however, can vary due to unavoidable manufacturing tolerances. The lengths of time vacuum and atmospheric pressure are supplied to the channels between the pairs of teat cups from the chambers inside the pulsator will also accordingly vary. This irregularity in the operations of known pulsators is called stagger.

The stagger in known pulsators is suppressed by means of varying the capacity of at least one of the chambers accommodated therein.

The capacity of the chambers directly affects the timing of compression and decompression therein. These procedures will be more rapid in smaller chambers. Reducing the capacity of the chambers will accordingly accelerate the bolt, increasing the rate of pulsation, and abbreviating the suction phases. If the capacity of only one chamber is reduced, only the suction phase in the same half of the pulsator will be abbreviated, suppressing the stagger.

The means of varying capacity in the known pulsator either complicate the mechanism considerably or allow only discontinuous stagger suppression.

Another pulsator is known from WIPO 8 902 216 A1. Stagger is suppressed by means that shift the extreme positions of a valve in relation to vacuum and atmosphere channels associated with it in the direction of the slide's stroke but without varying the length of the stroke. This type of control, however, is not practical for pulsators wherein the position of the slide in relation to the channels is dictated by additional apertures activated by the slide at the end of each stroke and accordingly activating the alternator, which then shifts the chambers back and forth between vacuum and atmospheric pressure. The slide does not change direction until one of the apertures is aligned with a chamber associated with it on the slide.

SUMMARY OF THE INVENTION

The object of the present invention is to improve a pulsator that has a slide functionally stationary in relation to the channels to the extent that its stagger can be simply and easily suppressed.

This object is attained by means of varying the distance between the slide and at least one of the diaphragms.

The diaphragms counter their displacement out of the neutral position by the slide as it moves back and forth with a force that is a function of their elasticity. This force decelerates the slide. If the two diaphragms have the same elasticity and if there are no other manufacturing tolerances present, the slide will take the same time to arrive at each end of its stroke. There will be no stagger. This ideal situation, however, never occurs, and the stagger must be suppressed once it exceeds a threshold of toleration.

When the distance between at least one diaphragm and the slide is varied, the diaphragm will be tensioned and will exert additional force on the slide.

When the distance is increased for example, the tension will counteract the slide's motion toward the diaphragm and will prolong the time the slide takes to arrive at the associated end of its stroke. The effect can be reversed by decreasing the distance. Decreasing the distance at one end of the slide while simultaneously increasing it at the other end will augment the effect. It has, surprisingly, been discovered that displacing the diaphragm even a fraction of a millimeter will suppress manufacturing-dictated stagger.

The means of varying the distance between the slide and at least one diaphragm in one advantageous embodiment of the invention comprise at least one threaded sleeve secured to one of the diaphragms and screwed onto a threaded section at one end of the bolt, which can neither rotate nor travel back and forth in the slide. Turning the bolt will accordingly displace the sleeve and with it the associated diaphragms axially in relation to the bolt, suppressing the stagger. If both diaphragms have sleeves with parallel threads, the desired action will be augmented even more.

The means of varying the distance between the slide and at least one diaphragm in another advantageous embodiment of the invention comprise a threaded connector between the bolt and the slide, whereby the diaphragms have sleeves secured axially to the ends of the bolt. Turning the bolt will axially displace it along the connection in relation to the slide. The sleeves at the ends of the bolt will also be axially displaced in the same direction, tensioning both membranes in one direction along the bolt.

The bolt will be easier to turn if it has a tool-engagement point where there is access without disassembly, within range of the slide for example. Stagger can accordingly be easily suppressed with disassembling the chambers.

Embodiments of the invention will now be specified with reference to the drawing, wherein

DETAILED DESCRIPTION OF THE INVENTION

Figure 1:
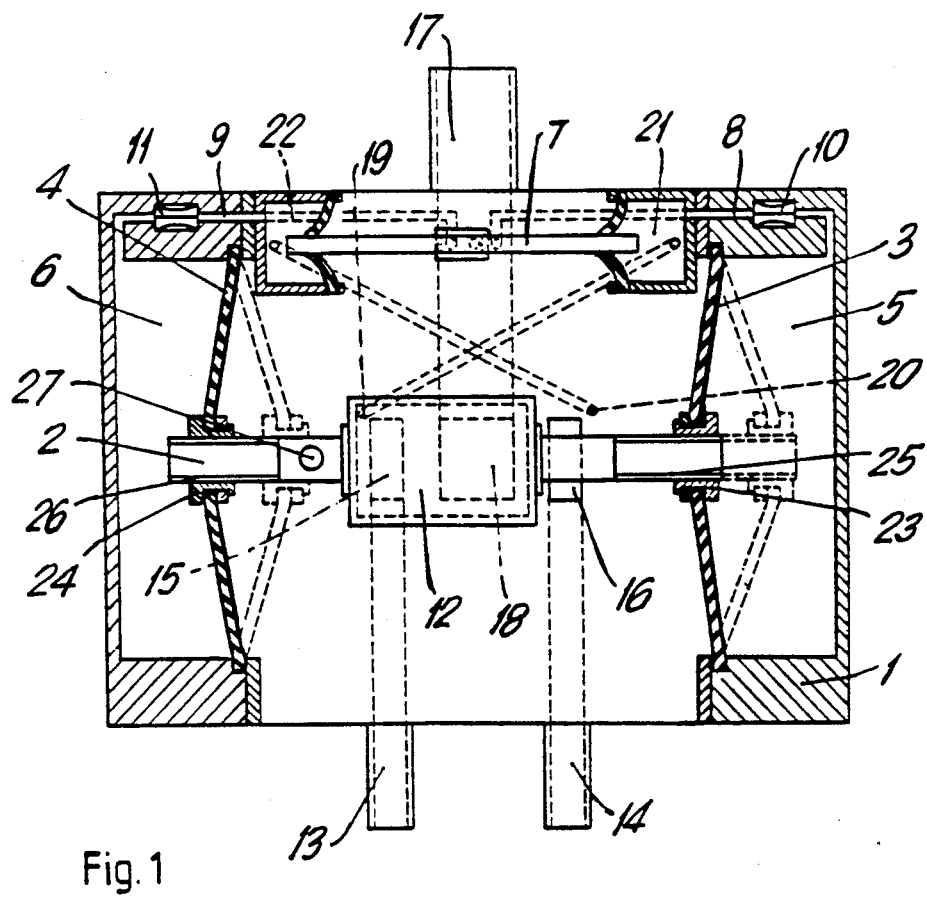
FIG. 1 is a schematic cross-section through a pulsator with threaded sleeves on each end of a bolt and FIG. 2 a schematic cross-section through a pulsator with a threaded connector between a bolt and a slide.

A pulsator has a housing 1. A bolt 2 slides back and forth in the housing. At each end of the bolt is a diaphragm 3 and 4. The diaphragms demarcate chambers 5 and 6. An alternator 7, the function of which is generally known, shifts chambers 5 and 6 back and forth and alternately between vacuum and atmospheric pressure by way of channels 8 and 9 and constrictions 10 and 11. A slide 12 mounted on bolt 2 connects connections 13 and 14, which lead to channels between the teat cups, back and forth and alternately by way of channels 15 and 16 to a source of vacuum by way of a vacuum channel 17 and to atmospheric pressure by way of a connection 18 as the bolt travels back and forth.

Slide 12 arrives at either end of its stroke once it has come into alignment with an aperture 19 or 20 that in the present case connects a chamber 21 or 22 to vacuum channel 17, activating alternator 7 and reversing the pressure levels in chambers 5 and 6. Slide 12 will now be shifted in the opposite direction.

Diaphragms 3 and 4 are secured to sections 25 and 26 with parallel threads at each end of bolt 2 by threaded sleeves 23 and 24. The sleeves rotate on but cannot be displaced along slide 12.

A tool-engagement point 27 in the form of a bore through bolt 2 within the operating range of slide 12 makes it possible to easily suppress stagger with any slender rod that will fit into the bore.

When tests of the pulsator indicate for example that the suction at connection 14 does not last as long as it does at connection 13, the rate can usually be equalized by turning bolt 2 less than a whole turn. The bolt will be turned in the direction that increases the distance between diaphragm 3 and slide 12 and decreases the distance between diaphragm 4 and the slide. Slide 12 will then take longer to arrive at aperture 20, and channel 16 will remain longer in communication with connection 18.

When bolt 2 is at the opposite end of its travel, the aforesaid means will lead to a shorter alignment with vacuum channel 15 and connection 18 and will accordingly abbreviate the duration of suction at connection 13.

The desired rate of pulsation can be simply attained by varying the distance between both diaphragms 3 and 4 and slide 12 to the same extent. This can easily be accomplished by rotating the diaphragms in opposite senses on the threaded sections 25 and 26 at each end of bolt 2. This procedure will advance the diaphragms 3 and 4 more or less far into chambers 5 and 6, varying their capacities, which in turn vary the rate.

Figure 2:
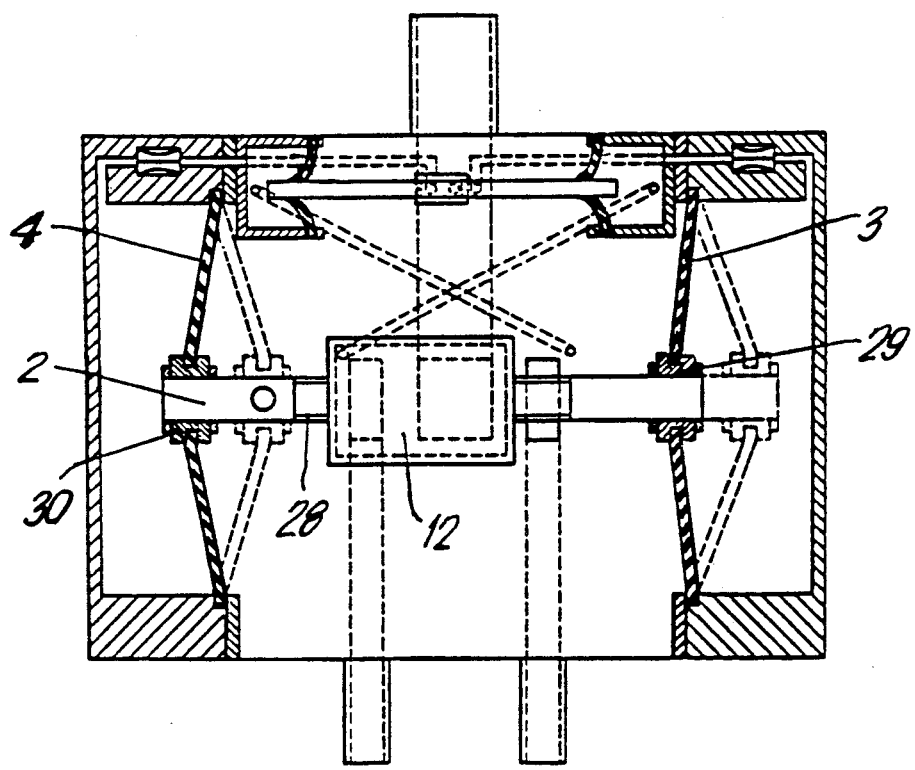

FIG. 2 illustrates a pulsator with a threaded connection 28 between the bolt 2 and the slide 12. Diaphragms 3 and 4 are axially secured to the ends of bolt 2 by sleeves 29 and 30 that the bolt rotates in. When bolt 2 rotates, it is displaced axially in relation to slide 12, carrying diaphragms 3 and 4 with it. The result is identical with that of the embodiment previously described herein.

What is claimed is:

1. A pulsator for a milking machine, comprising: a housing; a bolt mounted for longitudinal movement in the housing; means connectable to a vacuum source; means communicating with the atmosphere; means forming outlets connectable to teat cups during use; a slide mounted on the bolt intermediate of two ends thereof for longitudinal movement with the bolt in the housing to alternately connect the outlets to the means connectable to the vacuum source and the means providing communication to the atmosphere; means forming a chamber in the housing at each end of the slide including diaphragms connected to the housing and demarcating each chamber; means connecting each diaphragm to one end of the slide; alternator means activated in response to the movement of the slide to connect the two chambers alternately and back and forth between the vacuum source and the atmosphere to effect longitudinal movement of the slide; and wherein the means connecting the diaphragms to the ends of the slide comprise means for varying the distance between the slide and at least one of the diaphragms, said means for varying the distance between the slide and at least one of the diaphragms comprising sleeves connecting the diaphragms to the bolt to permit rotation without any relative axial movement and a threaded connection between the slide and the bolt to permit rotation of the bolt relative to the slide to adjust the axial position of the slide along the bolt and thereby vary the distance between the slide and the diaphragms.

2. The pulsator as in claim 1, wherein the sleeves and bolt are threaded and threadably engaged to permit rotation relative thereto adjust the axial position of the sleeve along the bolt and thereby vary the distance between the slide and the at least one diaphragm.

3. The pulsator as in claim 1, wherein the means for varying the distance between the slide and at least one of the diaphragms comprises means for receiving a tool to effect a change in the distance between the slide and the at least one diaphragm.

* * * * *